Patented Sept. 30, 1941

2,257,093

UNITED STATES PATENT OFFICE 2,257,093

DINITRO-BENZOTRIFLUORIDE COMPOUNDS

Martin E. Friedrich, Carneys Point, N. J., and Lester E. Schniepp, Wilmington, Del., assignors to E. I. du Pont de Nemours & Company, Wilmington, Del., a corporation of Delaware No Drawing. Application December 31, 1937, Serial No. 182,798

12 Claims. (Cl. 260—646)

This invention relates to derivatives of benzotrifluoride and especially to dinitro-benzotrifluorides and to processes of preparing the same.

It has been found that dinitro-amino-benzotrifluorides are valuable intermediates, such as for the production of azo dyes. These amino compounds are conveniently prepared by amination of dinitro-halo-benzotrifluorides. The compounds of the present invention are intermediates from which the dinitro-amino-benzotrifluorides may be prepared. They are new compounds and are valuable intermediates.

It is among the objects of the present invention to provide new dinitro-benzotrifluorides. Another object of the invention is to provide new halogen-substituted dintro-benzotrifluorides. Another object of the invention is to provide processes for manufacturing the new compounds. Still other objects of the invention will be apparent from the following description.

The objects of the invention are attained in general by dinitrating benzotrifluoride and halogen-substituted derivatives thereof in suitable reaction media and under controlled conditions which will produce the desired dinitration.

The invention will be more fully set forth in the following more detailed description which includes examples that are given as illustrative embodiments of the invention and not as limitations thereof.

Example I

Ortho - chloro - benzotrifluoride (180.5 parts) was dissolved in 200 parts of 96% sulfuric acid. This solution was cooled to 15° C. and agitated. A mixture of 130 parts of 96% sulfuric acid and 70 parts of fuming nitric acid (sp. g. 1.49) was added at such a rate that the temperature did not exceed 25° C. Agitation at 20° C. was continued for two hours after which the reaction mixture was drowned in 800 parts of ice. The precipitate of solids thus produced was removed from the mixture by filtration and washed with a dilute, ice-cold solution of soda ash. The crude mono-nitro compound was purified by vacuum distillation. Boiling range 105°-6° C./11 mm. The product was a mono-nitro-ortho-chlorobenzo-trifluoride.

Mono - nitro - o - chloro - benzotrifluoride (50 parts) was dissolved in 60 parts of 100% sulfuric acid and 10 parts of fuming sulfuric acid (24% $SO_3$). This solution was heated to 75° C. and a mixture of 40 parts of 100% sulfuric acid and 25 parts of fuming nitric acid (sp. g. 1.49) was added slowly with stirring. The reaction mixture then was heated to 95° C. and stirred at that temperature for 10 hours. The temperature was increased to 130° C. for a period of 2 hours. The reaction mixture was drowned in 800 parts of ice. The crude product which was precipitated in the mixture as solids was removed by filtration and washed acid-free. The crude product was purified by recrystallizing it from hot methyl alcohol. The purified product melted at 57°–59° C. and consisted essentially of 3,5-dinitro-2-chloro-benzotrifluoride.

3,5-dintro-2-bromo-benzotrifluoride was similarly produced by the nitration of o-bromo-benzotrifluoride.

Example II

Ortho - chloro - benzotrifluoride (180.5 parts) was dissolved in a mixture of 250 parts of 100% sulfuric acid and 50 parts of fuming sulfuric acid (24% $SO_3$). This solution was cooled to 20° C. and a mixture of 100 parts of 100% sulfuric acid and 70 parts of fuming nitric acid was (sp. g. 1.49) added, with stirring, at such a rate that the temperature did not exceed 30° C. The reaction mixture was then slowly heated to 75°–80° C. and a mixture of an additional 100 parts of 100% sulfuric acid and 70 parts of fuming nitric acid (sp. g. 1.49) added slowly. The temperature then was increased to 95° C. and the mixture agitated at that temperature for 10 hours. The temperature then was gradually raised to 130° C. and held there for a period of 2 hours. The reaction mixture was drowned in 1500 parts of ice and the product removed by filtration. The crude product was washed acid-free with cold water and recrystallized from methyl alcohol. The purified product melted at 57°–59° C. and was 3,5-dinitro-2-chloro-benzotrifluoride identical with that described in Example I.

3,5-dinitro-2-fluoro-benzotrifluoride was similarly produced by nitration of o-fluoro-benzotrifluoride.

Treated in a similar manner to the processes described in Examples I and II, benzotrifluoride yielded 3,5 - dinitro - benzotrifluoride, 4 - chlorobenzotrifluoride yielded 3,5-dinitro-4-chloro-benzotrifluoride and 4-fluoro-benzotrifluoride yielded 3,5-dinitro-4-fluoro-benzotrifluoride. Dinitration of 3-chloro, 3-fluoro or 3-bromo-benzotrifluoride yielded a mixture of products in which the nitro groups are in the 4,6- and 2,6- positions relative to the $CF_3$ group. In the specification and claims halogen refers to any of the group consisting of chlorine, bromine and fluorine. The halo-benzotrifluoride starting materials may be substituted by halogen in the ortho, meta or para position to trifluoro-methyl. As intermediates for dyes the 3,5-dintro-halo-benzotrifluorides are preferred. 3,5-dintro- 2 -chloro-benzotrifluoride is especially valuable.

The substitution of the second nitro group into the benzene nucleus is made in anhydrous sulfuric acid preferably containing an excess of sulfuric anhydride. Fuming nitric acid is a convenient nitrating agent but nitrate salts and other nitrating agents can be used. It is most convenient to add fuming nitric acid as a mixture of sulfuric and nitric acid which may be made by mixing the acids when cold. The temperature of the final nitration may be varied from 75° C. to 130° C. but temperatures of about 95° C. are found to give excellent results for the major part of the nitration. At the finish of the dinitration temperatures up to about 130° C. are desirable but heating to such a high temperature is not necessary except for the purpose of better yields.

*Example III*

3,5-dinitro-2-chloro-benzotrifluoride (46 parts) was dissolved in 150 parts of 90% methyl alcohol. The solution was agitated and heated to 50° C. At this temperature a solution of 10 parts of potassium hydroxide in 50 parts of 90% methyl alcohol was added slowly. The temperature was maintained and agitation continued for 10 hours. Two parts of concentrated sulfuric acid then was added to neutralize the excess potassium hydroxide and the methyl alcohol was removed by distillation. Water was added to the residue and the product extracted from this mixture with ether. The ether was evaporated and the product purified by vacuum distillation. The product was a viscous oil which boiled at 138°–140° C./5 mm. This material was essentially 3,5-dinitro-2-methoxy-benzotrifluoride.

In a similar manner 4-bromo-3,5-dinitro-benzotrifluoride is converted to 4-methoxy-3,5-dinitro-benzotrifluoride and 3-chloro-4,6-dinitro-benzotrifluoride yields 3-methoxy-4,6-dinitro-benzotrifluoride.

With the substitution of methyl alcohol by other primary aliphatic alcohols, such as ethyl, propyl or butyl alcohol, the corresponding dinitro-alkoxy benzotrifluorides are produced. Any alkali metal hydroxide can be used instead of potassium hydroxide.

Since from the foregoing description of the invention it will be apparent to those skilled in the art that various other embodiments of the invention may be made without departing from the spirit and scope thereof, it is to be understood that no limitations are intended except those which are specifically recited in the annexed claims or are imposed by the prior art.

We claim:
1. The benzotrifluorides represented by the formulae

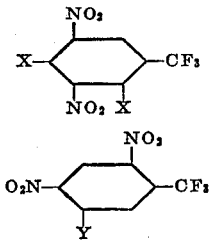

and

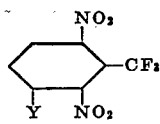

in which one X is hydrogen and the other is one of a group consisting of hydrogen, halogen and alkoxy; and Y is one of a group consisting of halogen and alkoxy.

2. The 3,5-dinitro-benzotrifluorides represented by the formula

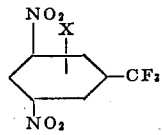

in which X is one of the group consisting of halogen, alkoxy and hydrogen.

3. The compounds represented by the formula

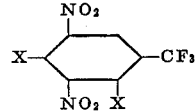

in which one X is halogen and the other X is hydrogen.

4. The compound represented by the formula

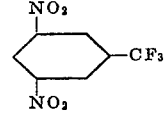

5. The compound represented by the formula

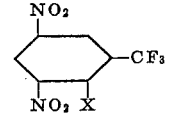

in which X is halogen.

6. The compound represented by the formula

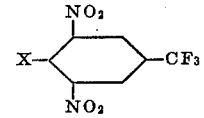

in which X is halogen.

7. As a new compound 2-chloro-3,5-dinitro-benzotrifluoride.

8. As a new compound 3,5-dinitro-4-chloro-benzotrifluoride.

9. The process which comprises dissolving one of the group consisting of a mono-nitro-benzotrifluoride, a mono-nitro-ortho-halo-benzotrifluoride, a mono-nitro-meta-halo-benzotrifluoride and a mono-nitro-para-halo-benzotrifluoride in a substantially anhydrous sulfuric acid medium, heating to about 75° C., adding sufficient fuming nitric acid for mono-nitrating said compound and continuing heating to a temperature not in excess of 130° C. until a dinitrated compound is produced.

10. The process which comprises dissolving a mono-nitro-halo-benzotrifluoride in a sulfuric acid medium containing essentially 100% sulfuric acid, heating to about 75° C. and adding sufficient fuming nitric acid to mono-nitrate the compound, and heating to a temperature between 95° C. and 130° C. until a dinitrated compound is produced.

11. The process which comprises dissolving a mono-nitro-halo-benzotrifluoride in a medium consisting of 100% sulfuric acid and fuming sulfuric acid, heating to 75° C. and adding at least sufficient of a mixture of 100% sulfuric acid and fuming nitric acid to mono-nitrate the compound, and heating to a temperature between 95° C. and 130° C. until a dinitrated compound is produced.

12. The process which comprises dissolving a mono-nitro-ortho-halo-benzotrifluoride in a medium consisting of 100% sulfuric acid and fuming sulfuric acid, heating to 75° C. and adding at least sufficient of a mixture of 100% sulfuric acid and fuming nitric acid to mono-nitrate the compound, and heating to a temperature between 95° C. and 130° C. until a dinitrated compound is produced.

MARTIN E. FRIEDRICH.
LESTER E. SCHNIEPP.